United States Patent [19]
Dobbrunz

[11] Patent Number: 5,333,976
[45] Date of Patent: Aug. 2, 1994

[54] CENTER LOCKING SPACING BOLT

[76] Inventor: Kurt A. Dobbrunz, 4401 Polk St., Hollywood, Fla. 33021

[21] Appl. No.: 80,123

[22] Filed: Jun. 23, 1993

[51] Int. Cl.⁵ .................. F16B 35/02; F16B 39/28
[52] U.S. Cl. ............................ 411/263; 411/383; 411/82
[58] Field of Search ............ 411/82, 258, 178, 263, 411/383, 384, 395, 243, 244

[56] References Cited

U.S. PATENT DOCUMENTS

| | | | |
|---|---|---|---|
| 268,607 | 12/1882 | Bell | 411/263 |
| 634,090 | 10/1899 | Mott | 411/393 X |
| 824,983 | 7/1906 | Farrington . | |
| 827,230 | 7/1906 | Goeppinger | 411/395 |
| 1,368,106 | 2/1921 | Brandt | 411/263 |
| 2,681,281 | 6/1954 | Medders | 411/263 X |
| 2,823,574 | 2/1958 | Rosan . | |
| 3,461,769 | 8/1969 | Brosseit . | |
| 4,108,407 | 8/1978 | Cable et al. | 411/384 X |
| 4,186,645 | 2/1980 | Zaydel . | |
| 4,295,765 | 10/1981 | Burke | 410/101 |

*Primary Examiner*—Neill R. Wilson
*Attorney, Agent, or Firm*—Oltman and Flynn

[57] ABSTRACT

A spacing bolt assembly for securing to a surface includes a cylindrical inner bolt portion having a first end with external threads in a first direction and a second end with a.head structure, an outer bolt portion having an axial bore for receiving the inner bolt portion and having a first end with external threads in a second direction and having a second end, and an aperture in the surface containing a central bore segment sized and threaded in the first direction to receive the first end of the inner bolt portion and a counterbore segment sized and threaded in the second direction to receive the first end of the outer bolt portion, so that the outer bolt portion can be screwed into the counterbore segment to a depth leaving a desired exposed length of the outer bolt portion protruding, and the inner bolt portion can be inserted through the axial bore and screwed into the central bore segment until the inner bolt portion head structure abuts and engages with friction the second end of the outer bolt portion to lock the inner and outer bolt portions together against rotation in either direction. The aperture is preferably provided in a mounting base portion including a plate to place against the surface and into which the aperture extends, and a structure for fastening the plate to the surface. A mass of solid material preferably extends from the plate into the surface, into which the aperture extends from the plate.

20 Claims, 3 Drawing Sheets

CENTER LOCKING SPACING BOLT

BACKGROUND OF THE INVENTION

1. Field of the Invention

The present invention relates generally to the field of bolts and other threaded fasteners, and more specifically to a locking bolt assembly, which extends above a surface to an adjustable extent and which is lockingly inserted into an aperture in a base member fastened to the surface, the aperture having a central segment and a countersunk segment, including a tubular outer bolt portion having external threads at a first end for screwing into the threaded countersunk segment of the aperture and having an axial bore, and an inner bolt portion in the form of a shaft having external threads at a first end oriented opposite to the threads on the outer bolt portion and being of greater length than the outer bolt portion, for inserting through the axial bore of the outer bolt portion and engaging opposite threads in the central segment of the aperture beyond the counterbore, and having a head at its second end for abutting and creating a friction engagement with the second end of the outer bolt portion, thereby binding and locking the outer and inner bolt portions together against rotation in either direction.

2. Description of the Prior Art

There have long been fastening structures having internally threaded tubular portions for performing spacing and securing functions. These structures generally have either not been of adjustable protruding distance or have not been lockingly securable.

One such prior structure is that of Burke, U.S. Pat. No. 4,295,765, issued on Oct. 20, 1981. Burke teaches a tie-down structure which fits into a hole in the bed of a truck, the hole being surrounded by a downwardly beveled rim portion. A body member is provided having an externally threaded stem portion, a beveled rim portion and an axial bore with an internal thread. The stem portion is fit downward through the hole and the beveled flange portion abuts the beveled rim of the hole. An annular positioning member fits over the stem portion from underneath the bed and has a beveled recess to fit snugly against the beveled rim area around the hole. The positioning member helps center the body portion and secure it against lateral movement. A nut fits over the stem portion and against the positioning member to fasten the structure in place. Then an eye bolt is screwed into the axial bore. A problem with Burke if used as a spacing bolt is that no provision is made to extend the bolt to various distances and to lock the bolt in place at those distances.

Farrington, U.S. Pat. No. 824,983, issued on Jul. 3, 1906, discloses a double screw assembly having an externally threaded outer body portion for screwing into a surface. The body portion has a point at one end for penetrating the surface and a threaded axial bore in the other end for receiving a conventional machine screw. The body portion provides a permanent anchor in which the machine screw can be removably inserted. A problem with Farrington if used as a spacing bolt is that no means is provided for locking the machine screw at varying insertion depths, to leave various shank lengths protruding.

Brosseit, U.S. Pat. No. 3,461,769, Aug. 19, 1969, reveals an adjustable length shoulder screw. An internally threaded tube having an external flange at one end is inserted through a hole in a first work piece until the flange abuts the rim of the hole. A coil spring is placed around the protruding end of the tube and the protruding end is placed over a threaded hole in a second work piece. A threaded rod, having an Allen wrench socket in one end, is screwed into the tube and partially into the threaded hole in the second work piece. The coil spring enhances friction between the threaded rod and the tube and the threaded hole, to prevent the rod from working loose. A problem with Brosseit is that it is apparently useful only for joining two work pieces. It is not suited for providing a locking spacing bolt of adjustable extension length.

Rosan, U.S. Pat. No. 2,823,574, issued on Feb. 18, 1958, discloses a self-tapping fastener. The fastener has a self-tapping end with threads of slightly reduced outside diameter, and a subsequent series of threads of slightly larger diameter, so that their tips have a predetermined interference fit with the screw thread cut by the self-tapping end. A replacement fastener is provided with at least one additional screw thread arranged for an interference fit to restrain the replacement fastener against accidental loosening. A problem with Rosan is that the use of the fastener is limited to surfaces made of materials which lend themselves to self-tapping. Another problem is that once the fastener is in place, it cannot be re-adjusted to a lesser depth without becoming loose.

Zaydel, U.S. Pat. No. 4,186,645, issued on Feb. 5, 1980, teaches a plastic plug, nut and stud fastener assembly for securing a first member to an apertured second member. An externally threaded tubular plug is inserted through the aperture until an external radial flange on the plug abuts the aperture rim. A nut is screwed over the tubular plug to secure it in the aperture. Then an end of a stud having a centrally located radial flange is pressed into the tubular plug, the interior of plug being splined to increase gripping friction. The other end of the stud beyond the flange, which is externally threaded, is fastened into a hole in the second member. A problem with Zaydel is that the extent of second end projection from the first member is not readily adjustable after installation.

It is thus an object of the present invention to provide a spacing bolt assembly which can be secured to most surfaces and protrudes to an adjustable distance.

It is another object of the present invention to provide such an assembly which can be locked into position when the protrusion distance is selected.

It is still another object of the present invention to provide such an assembly which can be unlocked and readjusted to a new protrusion distance with conventional wrenches.

It is finally an object of the present invention to provide such an assembly which is sturdy, reliable and relatively inexpensive to manufacture.

SUMMARY OF THE INVENTION

The present invention accomplishes the above-stated objectives, as well as others, as may be determined by a fair reading and interpretation of the entire specification.

A spacing bolt assembly is provided for securing to a surface, including a cylindrical inner bolt portion having a first end with external threads in a first direction and a second end with a head structure, an outer bolt portion having an axial bore for receiving the inner bolt portion and having a first end with external threads in a second direction and having a second end, and an aperture in the surface containing a central bore segment sized and threaded in the first direction to receive the first end of the inner bolt portion and a counterbore segment sized and threaded in the second direction to receive the first end of the outer bolt portion, so that the outer bolt portion can be screwed into the counterbore segment to a depth leaving a desired exposed length of the outer bolt portion protruding, and the inner bolt portion can be inserted through the axial bore and screwed into the central bore segment until the inner bolt portion head structure abuts and engages with friction the second end of the outer bolt portion to lock the inner and outer bolt portions together against rotation in either direction. The aperture is preferably provided in a mounting base portion including a plate to place against the surface and into which the aperture extends, and a structure for fastening the plate to the surface. A mass of solid material preferably extends from the plate into the surface, into which the aperture extends from the plate. The outer bolt second end preferably includes a beveled recess surrounding the opening of the axial bore and the inner bolt portion head structure has an abutting face which is beveled to correspond to and fit within the beveled recess to increase abutting surface area between the inner and outer bolt portions and to create a wedging engagement to enhance locking friction. The outer bolt portion may additionally include a head structure at the outer bolt portion second end against which the inner bolt portion head structure abuts during locking. The assembly may additionally include external threads on the outer bolt portion head structure, and a cap member sized and internally threaded to screw onto the head structure external threads to cover the inner bolt portion head structure and increase locking friction. Where the surface includes an internally threaded surface bore having a depth of a certain measure, the assembly may include a cylindrical insert member having a length less than the certain measure of the surface bore depth, and having external threads corresponding to the internal threads of the surface bore, and containing an internally threaded axial insert bore, for screwing to the bottom of the surface bore, so that a segment of the surface bore between the insert member and the opening of the surface bore functions as the counterbore segment and the axial insert bore functions as the central bore segment. The insert member may additionally include an adhesive package which ruptures within the surface bore to secure the insert member in the surface bore. The assembly may additionally include a socket portion in the axial insert bore to receive a tool for inserting the insert member into the surface bore. The socket portion is preferably configured to receive an Allen wrench.

BRIEF DESCRIPTION OF THE DRAWINGS

Various other objects, advantages, and features of the invention will become apparent to those skilled in the art from the following discussion taken in conjunction with the following drawings, in which.

DETAILED DESCRIPTION OF THE PREFERRED EMBODIMENTS

Figure 2:
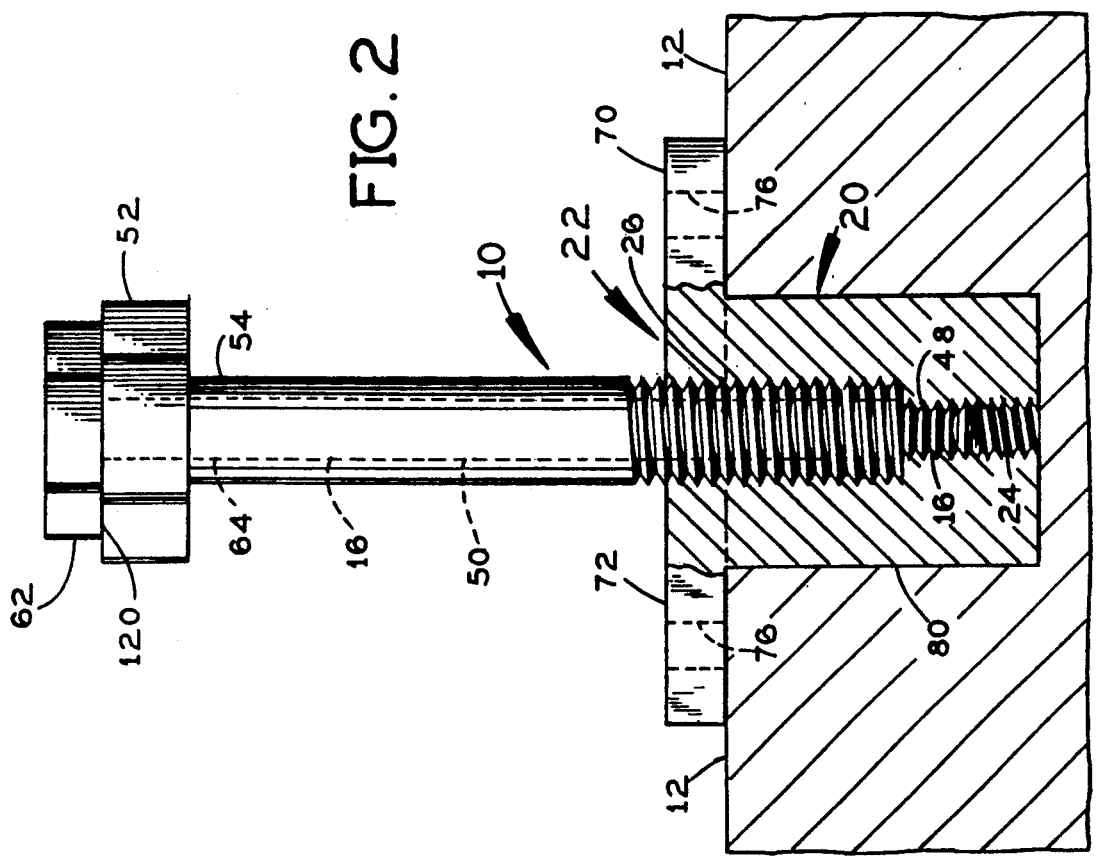
FIG. 2 is a cross-sectional side view of the embodiment of FIG. 1 inserted and locked into a mounting structure.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

FIRST PREFERRED EMBODIMENT

Figure 1:
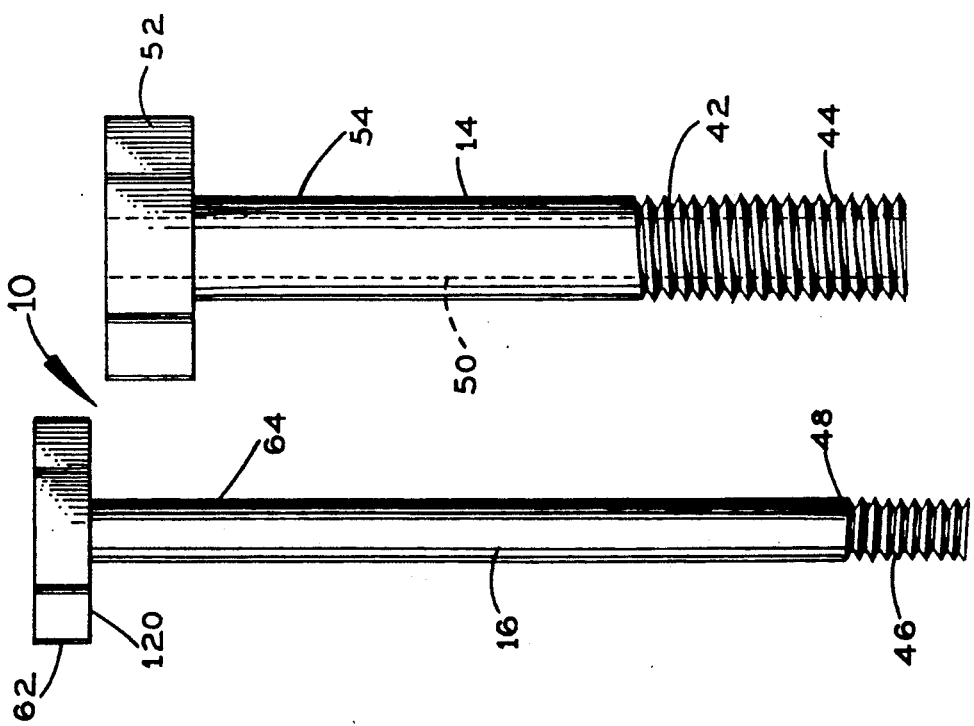
FIG. 1 is a side view of the basic preferred embodiment of the inner and outer bolt portions, with the outer bolt portion axial bore shown in broken lines.
Figure 3:
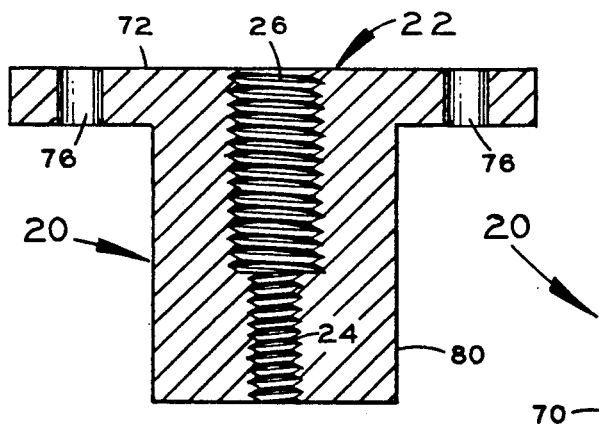
FIG. 3 is a cross-sectional side view of the mounting structure.
Figure 4:
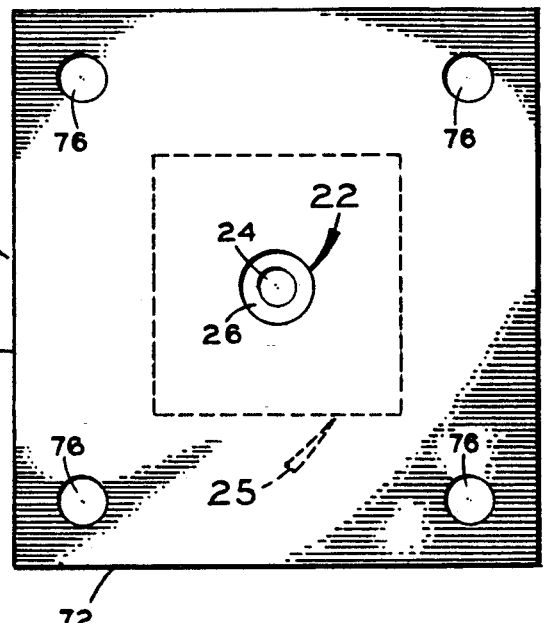
FIG. 4 is a top view of the mounting structure of FIG. 3.
Figure 5:
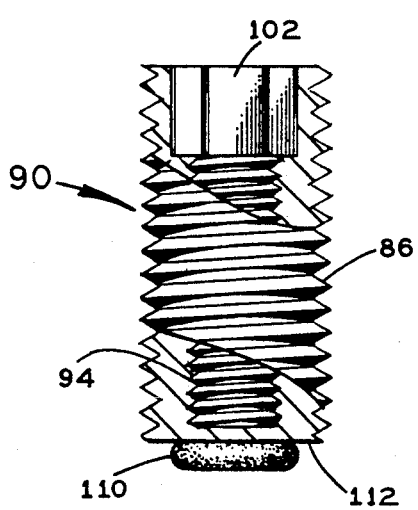
FIG. 5 is a cross-sectional side view of the insert member, having the optional adhesive package attached at its leading end.
Figure 6:
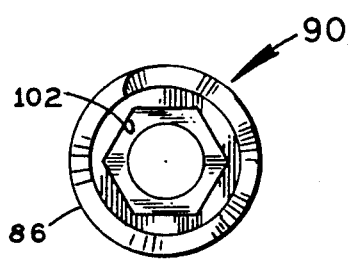
FIG. 6 is a top view of the insert member of FIG. 5.
Figure 7:
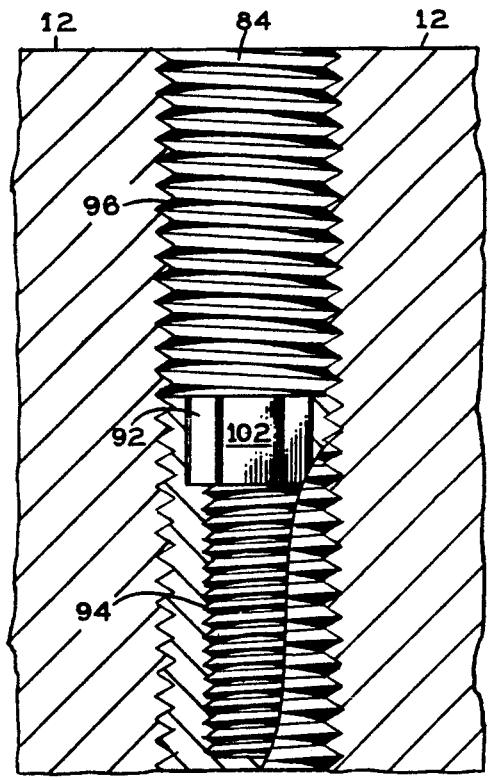
FIG. 7 is a cross-sectional side view of the insert member of FIGS. 5 and 6 inserted into a surface bore.
Figure 9:
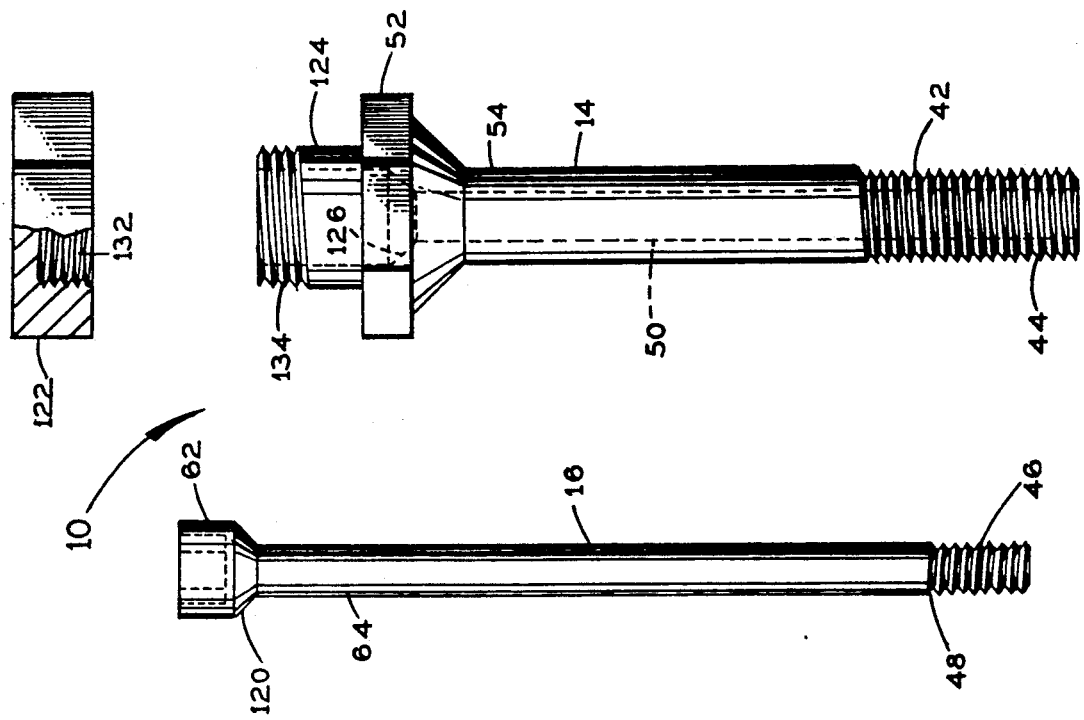
FIG. 9 is a side view of the preferred embodiment of the inner and outer bolt portions including the beveled head and recess feature, and as well as the threaded flange and cap feature, with the outer bolt portion axial bore and recess portion shown in broken lines.
Figure 8:
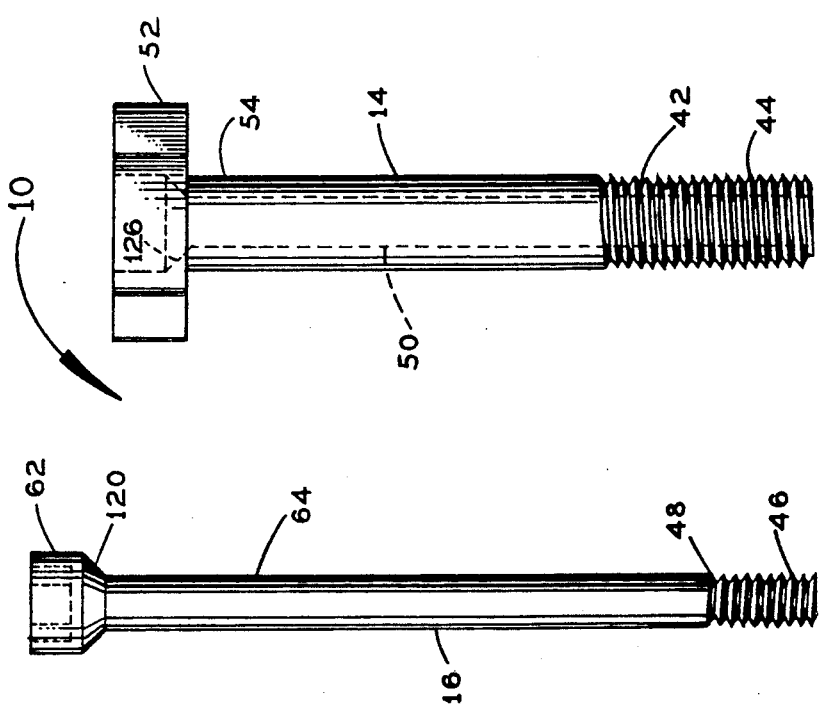
FIG. 8 is a side view of the preferred embodiment of the inner and outer bolt portions including the beveled head and recess feature, with the outer bolt portion axial bore and recess portion shown in broken lines.

Referring to FIGS. 1–9, a spacing bolt assembly 10 is provided which can be anchored to a surface 12 and can project from the surface 12 to an extent which is adjustable. Assembly 10 preferably includes a tubular outer bolt portion 14 and a cylindrical inner bolt portion 16. A mounting base portion 20 is also preferably provided for securing to surface 12 and having a countersunk bore 22 for receiving outer and inner bolt portions 14 and 16 respectively.

Bore 22 includes a central bore segment 24 and a counterbore segment 26. See FIG. 1. Central bore segment 24 has an inside diameter matching the outside diameter of inner bolt portion 16 and has internal first directional threads 32. Counterbore segment 26 has an inside diameter matching the outside diameter of outer bolt portion 14 and has internal second directional threads 34. First directional threads 32 and second directional threads 34, as their names suggest, are oriented opposite to each other. These first and second directions are understood to be rotational directions, one being clockwise and the other being counterclockwise. It does not matter which is which, as long as the first and second thread rotational directions oppose one another.

Outer bolt portion 14 has external threads 42 at a first end 44 for screwing into the internal second directional threads 32 of counterbore segment 26. An axial bore 50 extends longitudinally through outer bolt portion 14 and is sized to axially receive inner bolt portion 16. An annular head 52 is optionally provided on the second end 54 of outer bolt portion 14.

Inner bolt portion 16 is a solid shaft of greater length than outer bolt portion 14 to reach into central bore segment 24. Inner bolt portion 16 has external threads 46 at a first end 48 to engage first directional threads 32 in central bore segment 24. A head 62 is provided on the second end 64 of inner bolt portion 16 to abut and create a friction lock with head 52 of outer bolt portion 14. See FIG. 2.

Mounting base portion 20 preferably includes a square plate 70 having an exposed face 72 and an abutting face 74. See FIGS. 3 and 4. A mounting bore 76 is provided at each corner of plate 70 through which a fastener is inserted into surface 12. A block 80 protrudes from abutting face 74 and is integrally molded as part of, or welded to, plate 70, fitting into a hole in surface 12. Bore 22 extends from exposed face 72 into block 80.

An alternative base portion 20 may be created in an existing bore 84 in a surface 12. See FIGS. 5, 6 and 7. An insert member 90 is provided in the form of a cylinder 86 in which a central bore segment 94 axially extends into member outer end 92. Insert member 90 has a diameter and external threads 94 sized to screw into and against the bottom wall of existing bore 84. Existing bore 84 is longer than and extends forward of insert member 90, serving as counterbore segment 96. An Allen wrench receiving socket 102 is provided in outer end 92. A sack of adhesive 110 is preferably provided on insert member leading end 112 which ruptures against the bottom wall of existing bore 84 and anchors member 90 in place.

In practicing the invention, the following method may be used. Outer bolt portion 14 is screwed into counterbore segment 26 to a depth leaving the desired length of outer bolt portion 14 protruding from base portion 20. Inner bolt portion 16 is inserted through axial bore 50 of the outer bolt portion 14 and is oppositely screwed into central bore segment 24. See FIG. 2. Head 62 abuts and locks against head 52 or with second end 54 of the outer bolt portion 14, binding outer and inner bolt portions 14 and 16 together against rotation in either direction.

The lower face 120 of head 52 of inner bolt portion 16 is optionally beveled and optionally fits into a widened and correspondingly beveled segment 126 of axial bore 50. See FIG. 8. Outer bolt portion 14 is optionally provided with a cap 122 and an annular cap flange 124 extending axially from head 52. See FIG. 9. Internal cap 122 threads 132 engage external flange 124 threads 134. The thread engagement and the friction of cap 122 against head 52 further secures inner bolt portion 16 against rotation independent of outer bolt portion 14 to lock them against removal from base portion 20.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A spacing bolt assembly for securing to a surface, comprising:
   a cylindrical inner bolt portion having a first end with external threads in a first rotational direction and a second end with a radially protruding head structure,
   an outer bolt portion having an axial bore adapted to receive said inner bolt portion and having a segment at said second end narrower than said radially protruding head structure and having a first end with external threads in a second rotational direction and having a second end,
   an aperture in said surface containing a central bore segment sized and threaded in said first rotational direction to receive said first end of said inner bolt portion and a counterbore segment sized and threaded in said second rotational direction to receive said first end of said outer bolt portion,
   such that said outer bolt portion can be screwed into said counterbore segment to a depth leaving a desired exposed length of said outer bolt portion protruding, and said inner bolt portion can be inserted through said axial bore and screwed into said central bore segment until said inner bolt portion head structure abuts and engages with friction said second end of said outer bolt portion to lock said inner and outer bolt portions together against rotation in either rotational direction.

2. A spacing bolt assembly according to claim 1, wherein said aperture is provided in a mounting base portion comprising:
   a plate to place against said surface and into which said aperture extends,
   means for fastening said plate to said surface.

3. A spacing bolt assembly according to claim 2, additionally comprising a mass of solid material extending from said plate into said surface, into which said aperture extends from said plate.

4. A spacing bolt assembly according to claim 1, wherein said outer bolt second end comprises a beveled recess surrounding the opening of said axial bore and said inner bolt portion head structure has an abutting face which is beveled to correspond to and fit within said beveled recess to increase abutting surface area between said inner and outer bolt portions and to create a wedging engagement to enhance locking friction.

5. A spacing bolt assembly according to claim 1, wherein said outer bolt portion additionally comprises a head structure at said outer bolt portion second end against which said inner bolt portion head structure abuts during locking.

6. A spacing bolt assembly according to claim 5, additionally comprising:
   external threads on said outer bolt portion head structure,
   a cap member sized and internally threaded to screw onto said head structure external threads to cover said inner bolt portion head structure and increase locking friction.

7. A spacing bolt assembly according to claim 1, wherein said surface comprises an internally threaded surface bore having a depth of a certain measure, additionally comprising:
   a cylindrical insert member having a length less than said certain measure of said surface bore depth, and having external threads corresponding to said internal threads of said surface bore, and containing an internally threaded axial insert bore, for screwing to the bottom of said surface bore,
   such that a segment of said surface bore between said insert member and the opening of said surface bore functions as said counterbore segment and said axial insert bore functions as said central bore segment.

8. A spacing bolt assembly according to claim 7, wherein said insert member additionally comprises an adhesive package which ruptures within said surface bore to secure said insert member in said surface bore.

9. A spacing bolt assembly according to claim 7, additionally comprising a socket portion in said axial insert bore to receive a tool for inserting said insert member into said surface bore.

10. A spacing bolt assembly according to claim 9, wherein said socket portion is configured to receive an Allen wrench.

11. A spacing bolt assembly for securing to a surface, comprising:

a cylindrical inner bolt portion having a first end with external threads in a clockwise direction and a second end with a radially protruding head structure, an outer bolt portion having an axial bore adapted to receive said inner bolt portion and having a segment at said second end narrower than said radially protruding head structure and having a first end with external threads in a counterclockwise direction and having a second end, an aperture in said surface containing a central bore segment sized and threaded in said clockwise direction to receive said first end of said inner bolt portion and a counterbore segment sized and threaded in said counterclockwise direction to receive said first end of said outer bolt portion, such that said outer bolt portion can be screwed into said counterbore segment to a depth leaving a desired exposed length of said outer bolt portion protruding, and said inner bolt portion can be inserted through said axial bore and screwed into said central bore segment until said inner bolt portion head structure abuts and engages with friction said second end of said outer bolt portion to lock said inner and outer bolt portions together against rotation in either direction, wherein said outer bolt portion additionally comprises a radially protruding head structure at said outer bolt portion second end against which said inner bolt portion head structure abuts during locking.

12. A spacing bolt assembly according to claim 11, wherein said aperture is provided in a mounting base portion comprising:

a plate to place against said surface and into which said aperture extends, means for fastening said plate to said surface.

13. A spacing bolt assembly according to claim 12, additionally comprising a mass of solid material extending from said plate into said surface, into which said aperture extends from said plate.

14. A spacing bolt assembly according to claim 11, wherein said outer bolt second end comprises a beveled recess surrounding the opening of said axial bore and said inner bolt portion head structure has an abutting face which is beveled to correspond to and fit within said beveled recess to increase abutting surface area between said inner and outer bolt portions and to create a wedging engagement to enhance locking friction.

15. A spacing bolt assembly according to claim 11, additionally comprising:

external threads on said outer bolt portion head structure, a cap member sized and internally threaded to screw onto said head structure external threads to cover said inner bolt portion head structure and increase locking friction.

16. A spacing bolt assembly according to claim 11, wherein said surface comprises an internally threaded surface bore having a depth of a certain measure, additionally comprising:

a cylindrical insert member having a length less than said certain measure of said surface bore depth, and having external threads corresponding to said internal threads of said surface bore, and containing an internally threaded axial insert bore, for screwing to the bottom of said surface bore, such that a segment of said surface bore between said insert member and the opening of said surface bore functions as said counterbore segment and said axial insert bore functions as said central bore segment.

17. A spacing bolt assembly according to claim 16, wherein said insert member additionally comprises an adhesive package which ruptures within said surface bore to secure said insert member in said surface bore.

18. A spacing bolt assembly according to claim 16, additionally comprising a socket portion in said axial insert bore to receive a tool for inserting said insert member into said surface bore.

19. A spacing bolt assembly according to claim 9, wherein said socket portion is configured to receive an Allen wrench.

20. A spacing bolt assembly for securing to a surface, comprising:

a cylindrical inner bolt portion having a first end with external threads in a counterclockwise direction and a second end with a radially protruding head structure, an outer bolt portion having an axial bore adapted to receive said inner bolt portion and having a segment at said second end narrower than said radially protruding head structure and having a first end with external threads in a clockwise direction and having a second end, an aperture in said surface containing a central bore segment sized and threaded in said counterclockwise direction to receive said first end of said inner bolt portion and a counterbore segment sized and threaded in said clockwise direction to receive said first end of said outer bolt portion, such that said outer bolt portion can be screwed into said counterbore segment to a depth leaving a desired exposed length of said outer bolt portion protruding, and said inner bolt portion can be inserted through said axial bore and screwed into said central bore segment until said inner bolt portion head structure abuts and engages with friction said second end of said outer bolt portion to lock said inner and outer bolt portions together against rotation in either direction, wherein said outer bolt portion additionally comprises a radially protruding head structure at said outer bolt portion second end against which said inner bolt portion head structure abuts during locking.

* * * * *